United States Patent
Malani et al.

(10) Patent No.: US 11,403,450 B2
(45) Date of Patent: Aug. 2, 2022

(54) CONVERGENCE CENTRIC COVERAGE FOR CLOCK DOMAIN CROSSING (CDC) JITTER IN SIMULATION

(71) Applicant: Synopsys, Inc., Mountain View, CA (US)

(72) Inventors: Anshu Malani, Mountain View, CA (US); Paras Mal Jain, Cupertino, CA (US); Rajarshi Mukherjee, Mountain View, CA (US); Sudeep Mondal, Mountain View, CA (US)

(73) Assignee: Synopsys, Inc., Mountain View, CA (US)

( * ) Notice: Subject to any disclaimer, the term of this patent is extended or adjusted under 35 U.S.C. 154(b) by 0 days.

(21) Appl. No.: 17/139,915

(22) Filed: Dec. 31, 2020

(65) Prior Publication Data

US 2021/0209279 A1     Jul. 8, 2021

Related U.S. Application Data

(60) Provisional application No. 62/957,067, filed on Jan. 3, 2020.

(51) Int. Cl.
| | |
|---|---|
| *G06F 30/3315* | (2020.01) |
| *G06F 30/30* | (2020.01) |
| *G06F 30/3308* | (2020.01) |
| *G06F 119/12* | (2020.01) |

(52) U.S. Cl.
CPC ...... *G06F 30/3315* (2020.01); *G06F 30/3308* (2020.01); *G06F 2119/12* (2020.01)

(58) Field of Classification Search
None
See application file for complete search history.

(56) References Cited

U.S. PATENT DOCUMENTS

| | | | |
|---|---|---|---|
| 8,160,859 B2* | 4/2012 | Iwashita | G06F 30/33 703/15 |
| 8,359,173 B2* | 1/2013 | DiaaEldin | G06F 30/367 702/60 |
| 9,633,151 B1* | 4/2017 | Sun | G06F 30/3323 |
| 10,990,121 B2* | 4/2021 | Talupuru | G06F 1/08 |

OTHER PUBLICATIONS

M.-Y. Sum et al., "ToggleFinder: Accurate RTL Power Estimation For Large Designs," 2005 IEEE, pp. 16-19. (Year: 2005).*

* cited by examiner

*Primary Examiner* — Leigh M Garbowski
(74) *Attorney, Agent, or Firm* — Weaver Austin Villeneuve & Sampson LLP

(57) ABSTRACT

A system and method for providing convergence centric coverage for clock domain crossing (CDC) jitter in simulation is described. The method includes, in part, defining one or more design constraints associated with the circuit design, determining at least one group of converging signals associated with the circuit design using the one or more design constraints, applying a multitude of jitters to clock domain crossing (CDC) paths of the at least one group of converging signals, and storing the jitters in a jitter database.

20 Claims, 6 Drawing Sheets

CONVERGENCE CENTRIC COVERAGE FOR CLOCK DOMAIN CROSSING (CDC) JITTER IN SIMULATION

RELATED APPLICATION

The present application claims benefit under 35 USC 119(e) of U.S. Application Ser. No. 62/957,067, filed Jan. 3, 2020, entitled "Convergence Centric Coverage For CDC Jitter in Simulation", the content of which is incorporated herein by reference in its entirety.

TECHNICAL FIELD

The present disclosure generally relates to a verification system for integrated circuit (IC) design, and more particularly, to a system and method for providing convergence centric coverage for clock domain crossing (CDC) jitter in simulation.

BACKGROUND

Static timing verification systems are designed to verify data coherency by detecting setup and hold violations caused by metastability. FIG. 1 shows a pair of flip-flop chains 20, 30 supplying data to logic cloud 50. Assume bits D0 and B0 are correlated, e.g., bits of the same multi-bit data. Assume that both bits D0 and B0 transition from 0 to 1 during a given clock cycle. Assume further that a 0 to 1 transition on signal D0 causes a transition of 0 to 1 of signal D1. However, due to cycle uncertainty caused by timing violation, the 0 to 1 transition on signal B0 is assumed not to propagate to signal B1. Accordingly, the 00 to 11 transition on bits B0D0 will appears as 10 on signals D1B1 and D2B2 as shown.

SUMMARY

A method of verifying functionality of a circuit design, in accordance with one embodiment of the present disclosure, includes, in part, defining one or more design constraints associated with the circuit design, determining at least one group of converging signals associated with the circuit design using the one or more design constraints, applying a multitude of jitters to clock domain crossing (CDC) paths of the at least one group of converging signals, and storing the jitters in a jitter database.

In one embodiment, the method further includes, in part, compiling the circuit design, a test bench associated with the design, and the jitter database, applying the test bench and the jitters to the compiled circuit design using a simulation tool, determining the number of counts that two or more signals in the at least one group of signals toggle jointly, determining the number of jitters associated with each of the counts of the jointly toggling signals, and determining the test bench coverage from the number of jitters and their associated counts of the jointly toggling signals.

A system, in accordance with one embodiment of the present disclosure, includes, in part, a memory storing instructions, and a processor coupled with the memory to execute the instructions. The instructions, when executed, cause the processor to define one or more design constraints associated with the circuit design, determine at least one group of converging signals associated with the circuit design, apply a multitude of jitters to clock domain crossing (CDC) paths of the at least one group of converging signals, and store the multitude jitters in a jitter database.

In one embodiment, the instructions further cause the processor to compile the circuit design, a test bench associated with the design, and the jitter database. The instructions further cause the processor to apply the test bench and the multitude of jitters to the compiled circuit design using a simulation tool, determine the number of counts that two or more signals in the at least one group of signals toggle jointly, determine the number of jitters associated with each of the counts of the jointly toggling signals, and determine the test bench coverage from the number of jitters and their associated counts of the jointly toggling signals.

A non-transitory computer readable medium stores instructions, which when executed by a processor, cause the processor to define one or more design constraints associated with the circuit design, determine at least one group of converging signals associated with the circuit design, apply a multitude of jitters to clock domain crossing (CDC) paths of the at least one group of converging signals, and store the multitude of jitters in a jitter database.

In one embodiment, the instructions further cause the processor to compile the circuit design, a test bench associated with the design, and the jitter database. The instructions further cause the processor to apply the test bench and the multitude of jitters to the compiled circuit design using a simulation tool, determine the number of counts that two or more signals in the at least one group of signals toggle jointly, determine the number of jitters associated with each of the counts of the jointly toggling signals, and determine the test bench coverage from the number of jitters and their associated counts of the jointly toggling signals.

BRIEF DESCRIPTION OF THE DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

DETAILED DESCRIPTION

A clock domain crossing (CDC) verification system generates jitter for simulation-based convergence verification. Such a system injects random values on the intermediate signals to detect failures when the injected data violates the timing relationship with the associated clock. The setup/hold violations are then provided for the use of eliminating cycle uncertainty. If the results of a CDC verification system are dependent on test-bench quality, this may limit a user's ability to determine the coverage of random values injection. Since any metastability failure is seen downstream, the CDC verification system may not provide the user with information that can trace the failure to its source.

Aspects of the present disclosure relate to convergence centric coverage for CDC jitter in simulation. Some embodiments of the present disclosure are adapted to debug deep sequential CDC convergences reported by static verification systems, and further, generate simulation coverage models of correlated signals. To achieve this, embodiments of the present disclosure identify possible signal combinations that contribute to a convergence and compute the coverage when the jitter injection causes error due to CDC convergence. Embodiments of the present disclosure thus significantly reduce the time it takes to develop an effective testbench and determine its coverage.

Figure 1:
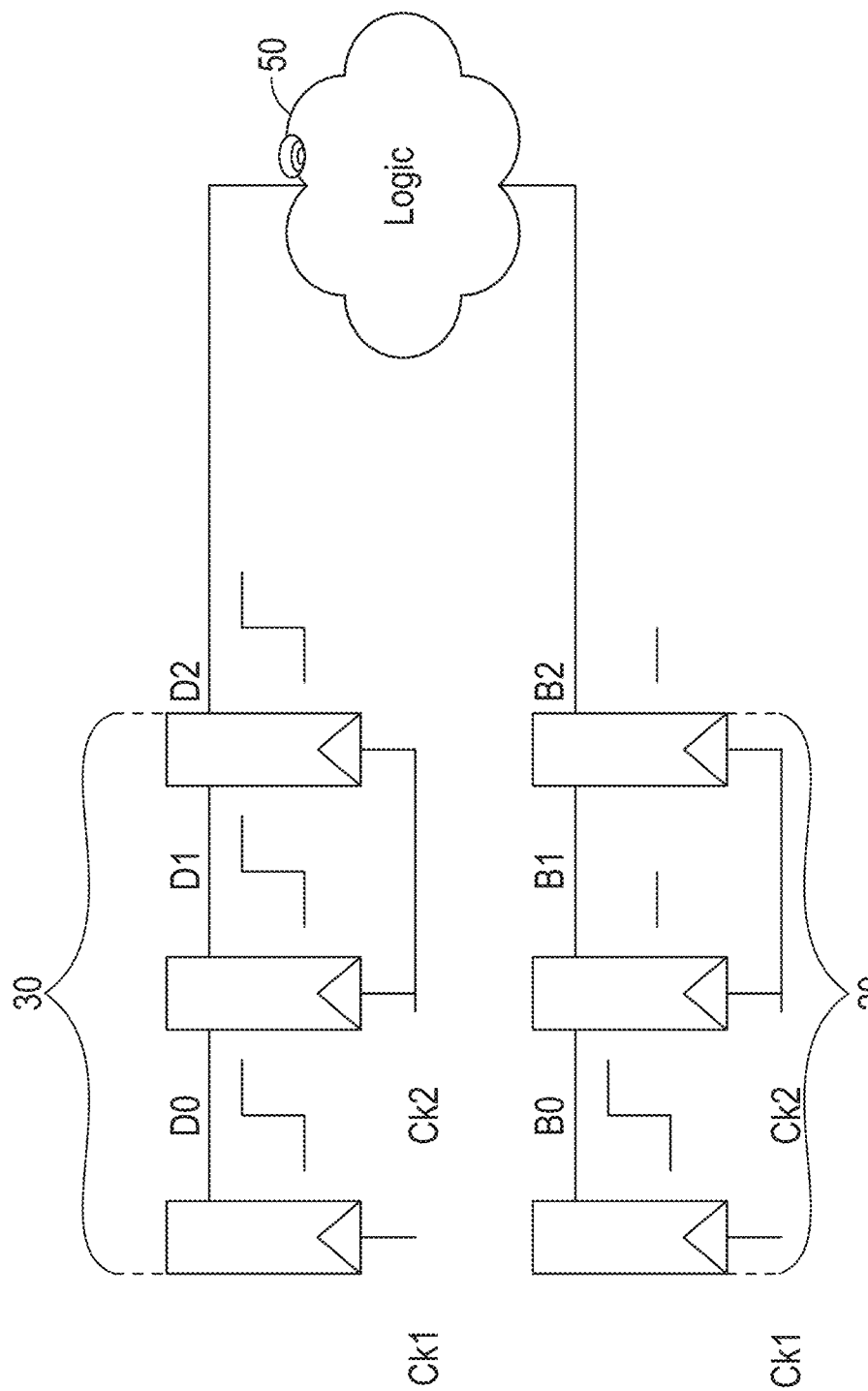
FIG. 1 shows a pair of flip-flop chains supplying data to a logic cloud.
Figure 2:
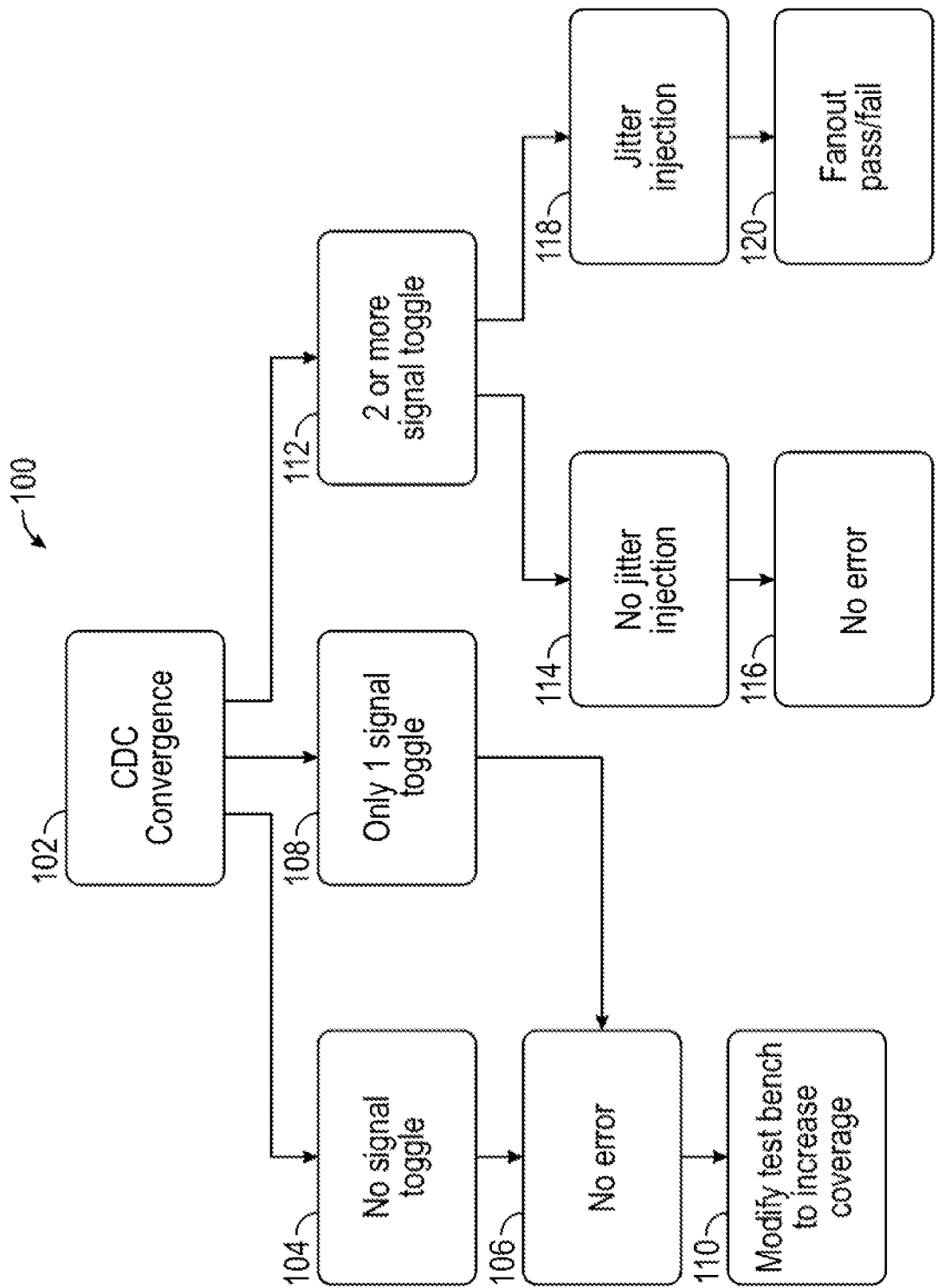
FIG. 2 is a flowchart for determining CDC coverage, in accordance with one embodiment of the present disclosure.

FIG. 2 is a flowchart 100 for determining and increasing CDC convergence, in accordance with one embodiment of the present disclosure. At 102, one or more groups of converging signals of a circuit design are formed and a test bench is applied to simulate the circuit design. The test bench, which includes assertion statements to verify the functionality of the circuit design and to ensure that the circuit design operates as intended, provides a reference simulation result against which the results from jitter injected simulations are compared. At 104 no jitter is injected and no signal is detected as toggling. Because at 104 no jitter is injected, the signal values are the same as their values from the reference simulation, and therefore no error is detected at 106. At 108 no jitter is injected and only one signal is detected as toggling. Because at 108 no jitter is injected, the signal value is the same as its value from the reference simulation, and therefore no error is detected. Subsequently the test bench may be modified at 110 to increase the test coverage.

If at 112, two or more signals of the circuit design are detected as toggling then jitter is injected randomly during a certain percentage of the simulation time at 118, and no jitter is injected at 114 during the remaining simulation time. In one example, random jitter may be injected during 50% of the simulation time. When no jitter is injected at 114, the signal values are the same as their values from the reference simulation, and therefore no error is detected at 116. If at 112, two or more signals are detected as toggling when jitter is injected at 118, a determination is made as to whether a fault exists by applying the test bench and detecting the signal values that fanout from the nets which received the jitter.

Assume there are 5 signals, namely signals S1, S2, S3, S4 and S5, that are associated with a logic block of a circuit design and that converge onto a logic cloud. Such signals are used to form a group and are herein referred to as a group of converging signals. Assume that a test bench applied to the logic design causes the number of toggles for each of signals S1, S2, S3, S4 and S5 as shown in Table I below.

TABLE I

| Signals | Number of toggles |
|---|---|
| S1 | 8 |
| S2 | 6 |
| S3 | 10 |
| S4 | 4 |
| S5 | NO |

To determine the CDC coverage and whether the test bench needs modification, in accordance with one aspect of the present disclosure, the data shown in Table II below is generated from the simulation results and the data shown in Table I:

TABLE II

| Signal | Number of Signals that jointly toggle | Number of jitters | Number of single signal toggle |
|---|---|---|---|
| S1 | 3 | 2 | 5 |
| S2 | 4 | 3 | 2 |
| S3 | 3 | 3 | 7 |
| S4 | No | 0 | 2 |
| S5 | NA | NA | NA |

The signal names are shown in column 1. As seen from column 2 of Table II, from the results of the applied test bench, signal S1 is seen as jointly toggling with other signals in the group 3 times, signal S2 is seen as jointly toggling with other signals in the group 4 times, and signal S3 is seen as jointly toggling with other signals in the group 3 times. Signal S4 is seen as not toggling with any other signal in the group. Signal S5 is not seen as toggling at all whether jointly or by itself. Because signal S4 is detected as not toggling with any other signals, and signal S5 is detected as not toggling at all, in accordance with one aspect of the present disclosure, the test bench is modified to cause signals S4 and S5 to toggle so as to increase the coverage.

Column 3 of Table II shows the number of jitters injected during associated transitions for each signal. For example, column 3 shows that two jitters were injected during toggles of signals S1, and three jitters were injected during toggles of signals S2. Column 4 shows the number of single toggles (i.e., not jointly with other signals) associated with each signal. For example, signal S1 is shown as having five single toggles, and signal S3 is shown as having 7 single toggles.

Using the result of the test bench and the data shown in Tables I and II, the number of toggles associated with signals that jointly toggle as well as the number of injected jitters for each such toggle are computed and tabulated, as shown in Table III below:

TABLE III

| Number of Signals that jointly toggle | Number of Toggles | Number of jitters |
|---|---|---|
| 1 | 16 | 4 |
| 2 | 2 | 1 |
| 3 | 2 | 2 |
| 4 | 0 | 0 |
| 5 | 0 | 0 |

As is seen from Table III, for example, the number of times that a signal toggles singly (i.e., not jointly with other signals) is shown as 16. The number of times that two signals toggle together is 2; the number of times that three signals toggle together is 2. Table III also shows that the test bench does not cause four or five signals to jointly toggle. The number of jitters injected during single signal toggles is shown as 4; the number of jitters injected during two-signal toggles is shown as 1; and the number of jitters injected during three-signal toggles is shown as 2.

According to one embodiment, if in response to N injections of jitter (N is an integer greater than 1), multiple signals are detected as jointly toggling N times, then the coverage is 100%. For example, if in response to 50 injected jitters, 50 joint signal toggling is detected, a coverage of 100% is achieved. Similarly, if in response to 25 injected jitters, 50 joint signal toggling is detected, a coverage of 50% is achieved. Referring, for example, to row 3 of Table III, since 3 signals are seen as jointly toggling in response to 2 injected jitters, the CDC coverage associated with this row is 66.67%. To increase the coverage, more jitters may be required or the test bench may be modified.

Figure 3:
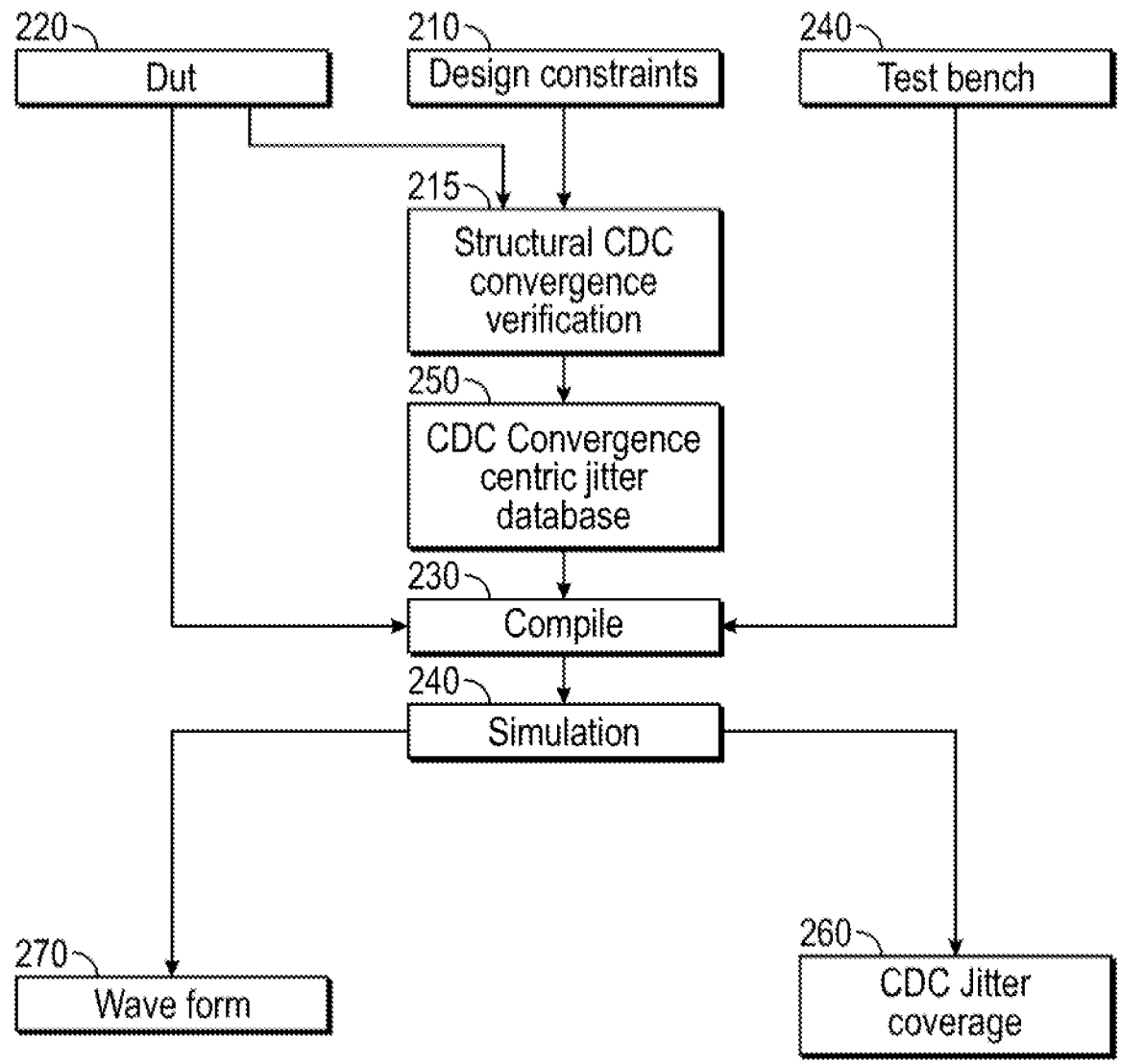
FIG. 3 shows a process for generating a CDC jitter database and CDC coverage statistics, in accordance with one embodiment of the present disclosure.

FIG. 3 shows a system and corresponding process for generating a CDC jitter database and CDC coverage statistics report, in accordance with one aspect of the present disclosure. Register Transfer Level (RTL) data representative of design under test (DUT) 220, and design constraints data 210 are used by CDC convergence verification system 215 to determine one or more groups of converging signals. In one example, design constraints 210, that may include data such as the timing relationship between various clocks and whether they are synchronous or not, is generated using a static verification system.

Next, a CDC convergence centric jitter database 250 is generated using, for example, a static verification system. The CDC convergence centric jitter database 250, in accordance with one aspect of the present disclosure, stores, among other elements, the jitter data that are applied to the DUT during simulation, as well as information about clock domain crossings, and the nets to which input/output terminals of various logic elements of the DUT are connected. Such terminals include, for example, the input terminals (D), output terminals (Q), and reset terminals (R) of sequential logic elements.

The jitter data stored in CDC convergence centric jitter database 250 together with the RTL data associated with DUT 220 and the test bench 240 are compiled at 230 and simulated at 240. In one example, the circuit design simulation may be performed using a simulation system. In accordance with one aspect of the present disclosure, the simulation results are used to generate the CDC jitter coverage report 260. The CDC jitter coverage report 260, which includes the data shown in Tables I, II and III, supplies data related to the coverage provided by the test bench as well as the of jitters in ensuring that the signals toggle jointly. If the coverage is determined to be below a threshold value, the user or circuit designer/tester may modify the testbench and/or change the jitter database. When a jitter is injected on a group of converging signals, the signals are marked as covered. This enables the determination of possible combinations of converging signals in which the jitter injection maximizes the coverage. The simulation results are also used to generate signal waveforms 270.

Figure 4:
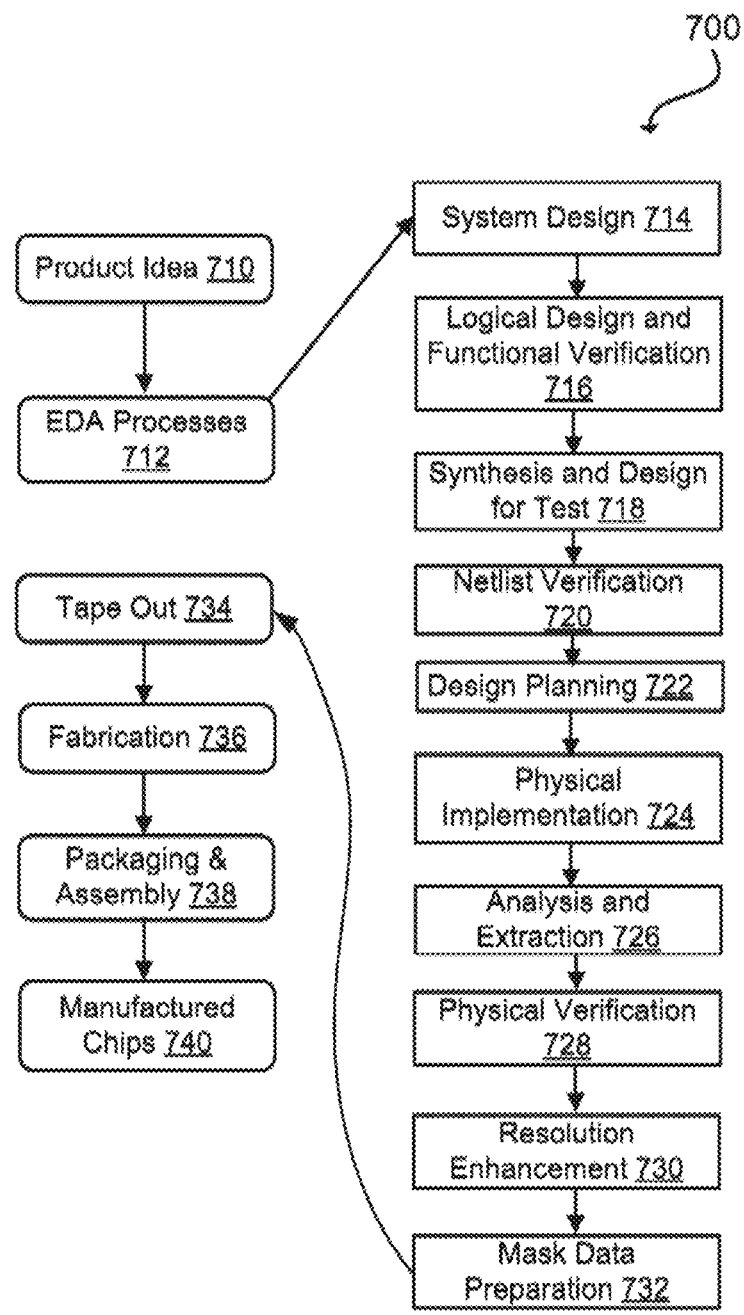
FIG. 4 depicts a flowchart of various processes used during the design and manufacture of an integrated circuit, in accordance with some embodiments of the present disclosure.

FIG. 4 illustrates an example set of processes 700 used during the design, verification, and fabrication of an article of manufacture such as an integrated circuit to transform and verify design data and instructions that represent the integrated circuit. Each of these processes can be structured and enabled as multiple modules or operations. The term 'EDA' signifies the term 'Electronic Design Automation.' These processes start with the creation of a product idea 710 with information supplied by a designer, information which is transformed to create an article of manufacture that uses a set of EDA processes 712. When the design is finalized, the design is taped-out 734, which is when artwork (e.g., geometric patterns) for the integrated circuit is sent to a fabrication facility to manufacture the mask set, which is then used to manufacture the integrated circuit. After tape-out, a semiconductor die is fabricated 736 and packaging and assembly processes 738 are performed to produce the finished integrated circuit 740.

Specifications for a circuit or electronic structure may range from low-level transistor material layouts to high-level description languages. A high-level of abstraction may be used to design circuits and systems, using a hardware description language ('HDL') such as VHDL, Verilog, SystemVerilog, SystemC, MyHDL or OpenVera. The HDL description can be transformed to a logic-level register transfer level ('RTL') description, a gate-level description, a layout-level description, or a mask-level description. Each lower abstraction level that is a less abstract description adds more useful detail into the design description, for example, more details for the modules that include the description. The lower levels of abstraction that are less abstract descriptions can be generated by a computer, derived from a design library, or created by another design automation process. An example of a specification language at a lower level of abstraction language for specifying more detailed descriptions is SPICE, which is used for detailed descriptions of circuits with many analog components. Descriptions at each level of abstraction are enabled for use by the corresponding tools of that layer (e.g., a formal verification tool). A design process may use a sequence depicted in FIG. 4. The processes described by be enabled by EDA products (or tools).

During system design 714, functionality of an integrated circuit to be manufactured is specified. The design may be optimized for desired characteristics such as power consumption, performance, area (physical and/or lines of code), and reduction of costs, etc. Partitioning of the design into different types of modules or components can occur at this stage.

During logic design and functional verification 716, modules or components in the circuit are specified in one or more description languages and the specification is checked for functional accuracy. For example, the components of the circuit may be verified to generate outputs that match the requirements of the specification of the circuit or system being designed. Functional verification may use simulators and other programs such as testbench generators, static HDL checkers, and formal verifiers. In some embodiments, special systems of components referred to as 'emulators' or 'prototyping systems' are used to speed up the functional verification.

During synthesis and design for test 718, HDL code is transformed to a netlist. In some embodiments, a netlist may be a graph structure where edges of the graph structure represent components of a circuit and where the nodes of the graph structure represent how the components are interconnected. Both the HDL code and the netlist are hierarchical articles of manufacture that can be used by an EDA product to verify that the integrated circuit, when manufactured, performs according to the specified design. The netlist can be optimized for a target semiconductor manufacturing technology. Additionally, the finished integrated circuit may be tested to verify that the integrated circuit satisfies the requirements of the specification.

During netlist verification 720, the netlist is checked for compliance with timing constraints and for correspondence with the HDL code. During design planning 722, an overall floor plan for the integrated circuit is constructed and analyzed for timing and top-level routing.

During layout or physical implementation 724, physical placement (positioning of circuit components such as transistors or capacitors) and routing (connection of the circuit components by multiple conductors) occurs, and the selection of cells from a library to enable specific logic functions can be performed. As used herein, the term 'cell' may specify a set of transistors, other components, and interconnections that provides a Boolean logic function (e.g., AND, OR, NOT, XOR) or a storage function (such as a flipflop or latch). As used herein, a circuit 'block' may refer to two or more cells. Both a cell and a circuit block can be referred to as a module or component and are enabled as both physical structures and in simulations. Parameters are specified for selected cells (based on 'standard cells') such as size and made accessible in a database for use by EDA products.

During analysis and extraction 726, the circuit function is verified at the layout level, which permits refinement of the layout design. During physical verification 728, the layout design is checked to ensure that manufacturing constraints are correct, such as DRC constraints, electrical constraints, lithographic constraints, and that circuitry function matches the HDL design specification. During resolution enhancement 730, the geometry of the layout is transformed to improve how the circuit design is manufactured.

During tape-out, data is created to be used (after lithographic enhancements are applied if appropriate) for production of lithography masks. During mask data preparation 732, the 'tape-out' data is used to produce lithography masks that are used to produce finished integrated circuits.

A storage subsystem of a computer system (such as computer system 900 of FIG. 9, or host system 807 of FIG. 8) may be used to store the programs and data structures that are used by some or all of the EDA products described herein, and products used for development of cells for the library and for physical and logical design that use the library.

Figure 5:
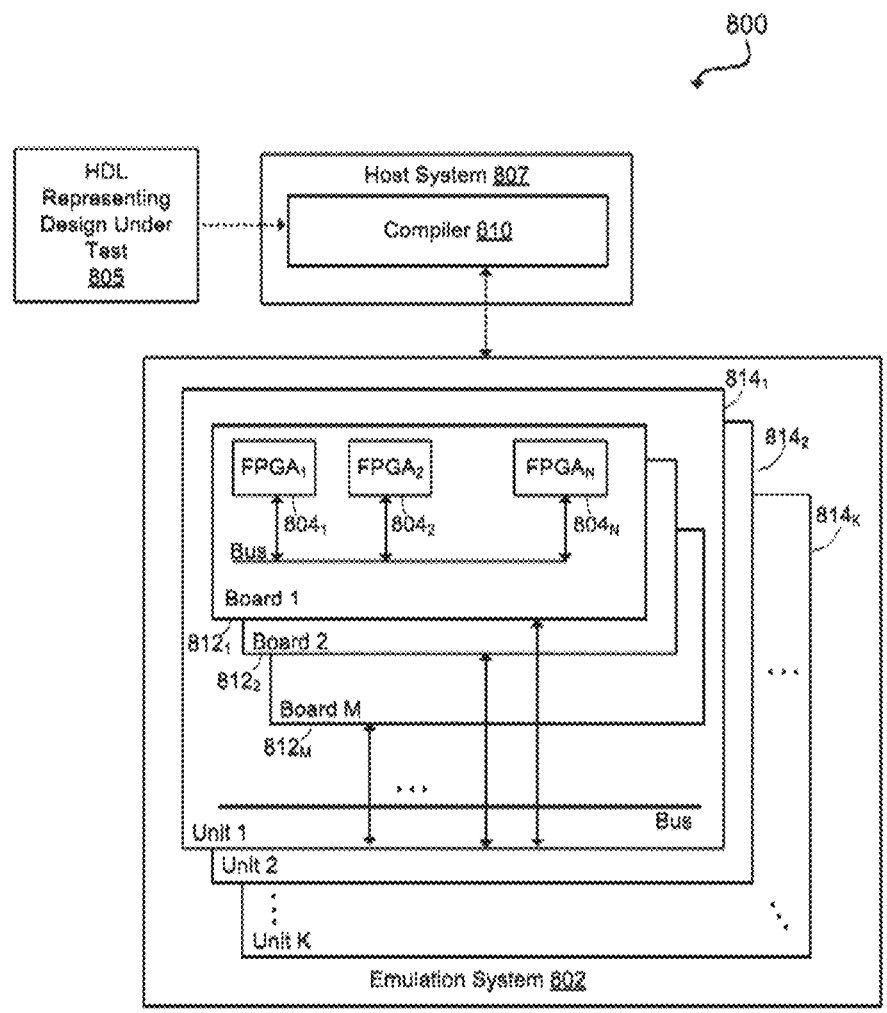
FIG. 5 depicts an abstract diagram of an example emulation system, in accordance with some embodiments of the present disclosure.

FIG. 5 depicts an abstract diagram of an example emulation environment 800. An emulation environment 800 may be configured to verify the functionality of the circuit design. The emulation environment 800 may include a host system 807 (e.g., a computer that is part of an EDA system) and an emulation system 802 (e.g., a set of programmable devices such as Field Programmable Gate Arrays (FPGAs) or processors). The host system generates data and information by using a compiler 810 to structure the emulation system to emulate a circuit design. A circuit design to be emulated is also referred to as a Design Under Test ('DUT') where data and information from the emulation are used to verify the functionality of the DUT.

The host system 807 may include one or more processors. In the embodiment where the host system includes multiple processors, the functions described herein as being performed by the host system can be distributed among the multiple processors. The host system 807 may include a compiler 810 to transform specifications written in a description language that represents a DUT and to produce data (e.g., binary data) and information that is used to structure the emulation system 802 to emulate the DUT. The compiler 810 can transform, change, restructure, add new functions to, and/or control the timing of the DUT.

The host system 807 and emulation system 802 exchange data and information using signals carried by an emulation connection. The connection can be, but is not limited to, one or more electrical cables such as cables with pin structures compatible with the Recommended Standard 232 (RS232) or universal serial bus (USB) protocols. The connection can be a wired communication medium or network such as a local area network or a wide area network such as the Internet. The connection can be a wireless communication medium or a network with one or more points of access using a wireless protocol such as BLUETOOTH or IEEE 802.11. The host system 807 and emulation system 802 can exchange data and information through a third device such as a network server.

The emulation system 802 includes multiple FPGAs (or other modules) such as FPGAs $804_1$ and $804_2$ as well as additional FPGAs to $804_N$. Each FPGA can include one or more FPGA interfaces through which the FPGA is connected to other FPGAs (and potentially other emulation components) for the FPGAs to exchange signals. An FPGA interface can be referred to as an input/output pin or an FPGA pad. While an emulator may include FPGAs, embodiments of emulators can include other types of logic blocks instead of, or along with, the FPGAs for emulating DUTs. For example, the emulation system 802 can include custom FPGAs, specialized ASICs for emulation or prototyping, memories, and input/output devices.

A programmable device can include an array of programmable logic blocks and a hierarchy of interconnections that can enable the programmable logic blocks to be interconnected according to the descriptions in the HDL code. Each of the programmable logic blocks can enable complex combinational functions or enable logic gates such as AND, and XOR logic blocks. In some embodiments, the logic blocks also can include memory elements/devices, which can be simple latches, flip-flops, or other blocks of memory. Depending on the length of the interconnections between different logic blocks, signals can arrive at input terminals of the logic blocks at different times and thus may be temporarily stored in the memory elements/devices.

FPGAs $804_1$-$804_N$ may be placed onto one or more boards $812_1$ and $812_2$ as well as additional boards through $812_M$. Multiple boards can be placed into an emulation unit $814_1$. The boards within an emulation unit can be connected using the backplane of the emulation unit or any other types of connections. In addition, multiple emulation units (e.g., $814_1$ and $814_2$ through $814_K$) can be connected to each other by cables or any other means to form a multi-emulation unit system.

For a DUT that is to be emulated, the host system 807 transmits one or more bit files to the emulation system 802. The bit files may specify a description of the DUT and may further specify partitions of the DUT created by the host system 807 with trace and injection logic, mappings of the partitions to the FPGAs of the emulator, and design constraints. Using the bit files, the emulator structures the FPGAs to perform the functions of the DUT. In some embodiments, one or more FPGAs of the emulators may have the trace and injection logic built into the silicon of the FPGA. In such an embodiment, the FPGAs may not be structured by the host system to emulate trace and injection logic.

The host system 807 receives a description of a DUT that is to be emulated. In some embodiments, the DUT description is in a description language (e.g., a register transfer language (RTL)). In some embodiments, the DUT description is in netlist level files or a mix of netlist level files and HDL files. If part of the DUT description or the entire DUT description is in an HDL, then the host system can synthesize the DUT description to create a gate level netlist using the DUT description. A host system can use the netlist of the DUT to partition the DUT into multiple partitions where one or more of the partitions include trace and injection logic. The trace and injection logic traces interface signals that are exchanged via the interfaces of an FPGA. Additionally, the trace and injection logic can inject traced interface signals into the logic of the FPGA. The host system maps each partition to an FPGA of the emulator. In some embodiments, the trace and injection logic is included in select partitions for a group of FPGAs. The trace and injection logic can be built into one or more of the FPGAs of an emulator. The host system can synthesize multiplexers to be mapped into the FPGAs. The multiplexers can be used by the trace and injection logic to inject interface signals into the DUT logic.

The host system creates bit files describing each partition of the DUT and the mapping of the partitions to the FPGAs. For partitions in which trace and injection logic are included, the bit files also describe the logic that is included. The bit files can include place and route information and design constraints. The host system stores the bit files and information describing which FPGAs are to emulate each component of the DUT (e.g., to which FPGAs each component is mapped).

Upon request, the host system transmits the bit files to the emulator. The host system signals the emulator to start the emulation of the DUT. During emulation of the DUT or at the end of the emulation, the host system receives emulation results from the emulator through the emulation connection. Emulation results are data and information generated by the emulator during the emulation of the DUT which include interface signals and states of interface signals that have been traced by the trace and injection logic of each FPGA. The host system can store the emulation results and/or transmits the emulation results to another processing system.

After emulation of the DUT, a circuit designer can request to debug a component of the DUT. If such a request is made, the circuit designer can specify a time period of the emulation to debug. The host system identifies which FPGAs are emulating the component using the stored information. The host system retrieves stored interface signals associated with the time period and traced by the trace and injection logic of each identified FPGA. The host system signals the emulator to re-emulate the identified FPGAs. The host system transmits the retrieved interface signals to the emulator to re-emulate the component for the specified time period. The trace and injection logic of each identified FPGA injects its respective interface signals received from the host system into the logic of the DUT mapped to the FPGA. In case of multiple re-emulations of an FPGA, merging the results produces a full debug view.

The host system receives, from the emulation system, signals traced by logic of the identified FPGAs during the re-emulation of the component. The host system stores the signals received from the emulator. The signals traced during the re-emulation can have a higher sampling rate than the sampling rate during the initial emulation. For example, in the initial emulation a traced signal can include a saved state of the component every X milliseconds. However, in the re-emulation the traced signal can include a saved state every Y milliseconds where Y is less than X. If the circuit designer requests to view a waveform of a signal traced during the re-emulation, the host system can retrieve the stored signal and display a plot of the signal. For example, the host system can generate a waveform of the signal. Afterwards, the circuit designer can request to re-emulate the same component for a different time period or to re-emulate another component.

A host system 807 and/or the compiler 810 may include sub-systems such as, but not limited to, a design synthesizer sub-system, a mapping sub-system, a run time sub-system, a results sub-system, a debug sub-system, a waveform sub-system, and a storage sub-system. The sub-systems can be structured and enabled as individual or multiple modules or two or more may be structured as a module. Together these sub-systems structure the emulator and monitor the emulation results.

The design synthesizer sub-system transforms the HDL that is representing a DUT 805 into gate level logic. For a DUT that is to be emulated, the design synthesizer sub-system receives a description of the DUT. If the description of the DUT is fully or partially in HDL (e.g., RTL or other level of abstraction), the design synthesizer sub-system synthesizes the HDL of the DUT to create a gate-level netlist with a description of the DUT in terms of gate level logic.

The mapping sub-system partitions DUTs and maps the partitions into emulator FPGAs. The mapping sub-system partitions a DUT at the gate level into a number of partitions using the netlist of the DUT. For each partition, the mapping sub-system retrieves a gate level description of the trace and injection logic and adds the logic to the partition. As described above, the trace and injection logic included in a partition is used to trace signals exchanged via the interfaces of an FPGA to which the partition is mapped (trace interface signals). The trace and injection logic can be added to the DUT prior to the partitioning. For example, the trace and injection logic can be added by the design synthesizer sub-system prior to or after the synthesizing the HDL of the DUT.

In addition to including the trace and injection logic, the mapping sub-system can include additional tracing logic in a partition to trace the states of certain DUT components that are not traced by the trace and injection. The mapping sub-system can include the additional tracing logic in the DUT prior to the partitioning or in partitions after the partitioning. The design synthesizer sub-system can include the additional tracing logic in an HDL description of the DUT prior to synthesizing the HDL description.

The mapping sub-system maps each partition of the DUT to an FPGA of the emulator. For partitioning and mapping, the mapping sub-system uses design rules, design constraints (e.g., timing or logic constraints), and information about the emulator. For components of the DUT, the mapping sub-system stores information in the storage sub-system describing which FPGAs are to emulate each component.

Using the partitioning and the mapping, the mapping sub-system generates one or more bit files that describe the created partitions and the mapping of logic to each FPGA of the emulator. The bit files can include additional information such as constraints of the DUT and routing information of connections between FPGAs and connections within each FPGA. The mapping sub-system can generate a bit file for each partition of the DUT and can store the bit file in the storage sub-system. Upon request from a circuit designer, the mapping sub-system transmits the bit files to the emulator, and the emulator can use the bit files to structure the FPGAs to emulate the DUT.

If the emulator includes specialized ASICs that include the trace and injection logic, the mapping sub-system can generate a specific structure that connects the specialized ASICs to the DUT. In some embodiments, the mapping sub-system can save the information of the traced/injected signal and where the information is stored on the specialized ASIC.

The run time sub-system controls emulations performed by the emulator. The run time sub-system can cause the emulator to start or stop executing an emulation. Additionally, the run time sub-system can provide input signals and data to the emulator. The input signals can be provided directly to the emulator through the connection or indirectly through other input signal devices. For example, the host system can control an input signal device to provide the input signals to the emulator. The input signal device can be, for example, a test board (directly or through cables), signal generator, another emulator, or another host system.

The results sub-system processes emulation results generated by the emulator. During emulation and/or after completing the emulation, the results sub-system receives emulation results from the emulator generated during the emulation. The emulation results include signals traced during the emulation. Specifically, the emulation results include interface signals traced by the trace and injection logic emulated by each FPGA and can include signals traced by additional logic included in the DUT. Each traced signal can span multiple cycles of the emulation. A traced signal includes multiple states and each state is associated with a time of the emulation. The results sub-system stores the traced signals in the storage sub-system. For each stored signal, the results sub-system can store information indicating which FPGA generated the traced signal.

The debug sub-system allows circuit designers to debug DUT components. After the emulator has emulated a DUT and the results sub-system has received the interface signals traced by the trace and injection logic during the emulation, a circuit designer can request to debug a component of the DUT by re-emulating the component for a specific time period. In a request to debug a component, the circuit designer identifies the component and indicates a time period of the emulation to debug. The circuit designer's request can include a sampling rate that indicates how often states of debugged components should be saved by logic that traces signals.

The debug sub-system identifies one or more FPGAs of the emulator that are emulating the component using the information stored by the mapping sub-system in the storage sub-system. For each identified FPGA, the debug sub-system retrieves, from the storage sub-system, interface signals traced by the trace and injection logic of the FPGA during the time period indicated by the circuit designer. For example, the debug sub-system retrieves states traced by the trace and injection logic that are associated with the time period.

The debug sub-system transmits the retrieved interface signals to the emulator. The debug sub-system instructs the debug sub-system to use the identified FPGAs and for the trace and injection logic of each identified FPGA to inject its respective traced signals into logic of the FPGA to re-emulate the component for the requested time period. The debug sub-system can further transmit the sampling rate provided by the circuit designer to the emulator so that the tracing logic traces states at the proper intervals.

To debug the component, the emulator can use the FPGAs to which the component has been mapped. Additionally, the re-emulation of the component can be performed at any point specified by the circuit designer.

For an identified FPGA, the debug sub-system can transmit instructions to the emulator to load multiple emulator FPGAs with the same configuration of the identified FPGA. The debug sub-system additionally signals the emulator to use the multiple FPGAs in parallel. Each FPGA from the multiple FPGAs is used with a different time window of the interface signals to generate a larger time window in a shorter amount of time. For example, the identified FPGA can require an hour or more to use a certain amount of cycles. However, if multiple FPGAs have the same data and structure of the identified FPGA and each of these FPGAs runs a subset of the cycles, the emulator can require a few minutes for the FPGAs to collectively use all the cycles.

A circuit designer can identify a hierarchy or a list of DUT signals to re-emulate. To enable this, the debug sub-system determines the FPGA needed to emulate the hierarchy or list of signals, retrieves the necessary interface signals, and transmits the retrieved interface signals to the emulator for re-emulation. Thus, a circuit designer can identify any element (e.g., component, device, or signal) of the DUT to debug/re-emulate.

The waveform sub-system generates waveforms using the traced signals. If a circuit designer requests to view a waveform of a signal traced during an emulation run, the host system retrieves the signal from the storage sub-system. The waveform sub-system displays a plot of the signal. For one or more signals, when the signals are received from the emulator, the waveform sub-system can automatically generate the plots of the signals.

Figure 6:
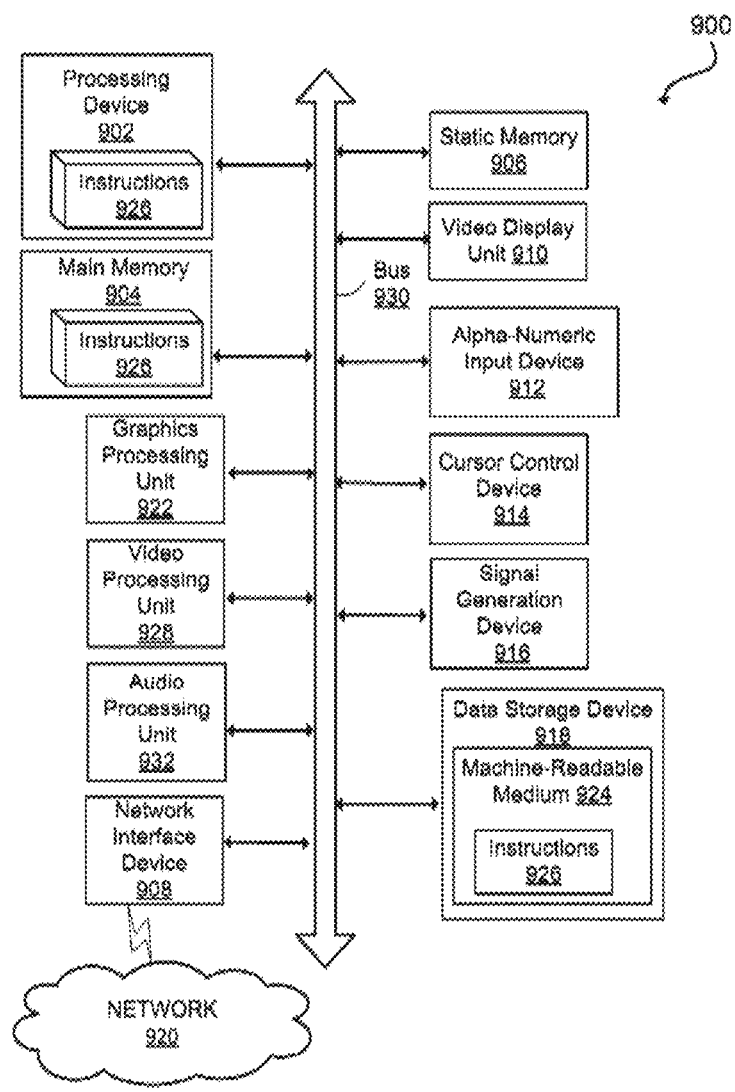
FIG. 6 depicts an abstract diagram of an example computer system in which embodiments of the present disclosure may operate.

FIG. 6 illustrates an example machine of a computer system 900 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 900 includes a processing device 902, a main memory 904 (e.g., read-only memory (ROM), flash memory, dynamic random access memory (DRAM) such as synchronous DRAM (SDRAM), a static memory 906 (e.g., flash memory, static random access memory (SRAM), etc.), and a data storage device 918, which communicate with each other via a bus 930.

Processing device 902 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 902 may also be one or more special-purpose processing devices such as an application specific integrated circuit (ASIC), a field programmable gate array (FPGA), a digital signal processor (DSP), network processor, or the like. The processing device 902 may be configured to execute instructions 926 for performing the operations and steps described herein.

The computer system 900 may further include a network interface device 908 to communicate over the network 920. The computer system 900 also may include a video display unit 910 (e.g., a liquid crystal display (LCD) or a cathode ray tube (CRT)), an alphanumeric input device 912 (e.g., a keyboard), a cursor control device 914 (e.g., a mouse), a graphics processing unit 922, a signal generation device 916 (e.g., a speaker), graphics processing unit 922, video processing unit 928, and audio processing unit 932.

The data storage device 918 may include a machine-readable storage medium 924 (also known as a non-transitory computer-readable medium) on which is stored one or more sets of instructions 926 or software embodying any one or more of the methodologies or functions described herein. The instructions 926 may also reside, completely or at least partially, within the main memory 904 and/or within the processing device 902 during execution thereof by the computer system 900, the main memory 904 and the processing device 902 also constituting machine-readable storage media.

In some implementations, the instructions 926 include instructions to implement functionality corresponding to the present disclosure. While the machine-readable storage medium 924 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 902 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed is:

1. A method of verifying functionality of a circuit design, the method comprising:
    defining one or more design constraints associated with the circuit design;
    determining at least one group of converging signals associated with the circuit design using the one or more design constraints;
    applying a plurality of jitters to clock domain crossing (CDC) paths of the at least one group of converging signals;
    storing, in a jitter database, the plurality of jitters;
    determining number of counts that two or more signals in the at least one group of signals toggle jointly;
    determining number of jitters associated with each of the counts of the jointly toggling signals; and
    determining a test bench coverage from the number of jitters and their associated counts of the jointly toggling signals.

2. The method of claim 1 further comprising:
    compiling the circuit design, a test bench associated with the design, and the jitter database; and
    applying the test bench and the plurality of jitters to the compiled circuit design using a simulation tool.

3. The method of claim 1 further comprising:
    modifying the test bench if the test bench coverage is determined to be less than a threshold value.

4. The method of claim 1 further comprising:
modifying the jitter database if the test bench coverage is determined to be less than a threshold value.

5. The method of claim 1 further comprising:
determining if a first signal in the at least one group of signals toggles singly; and
modifying the test bench or the jitter database to cause the first signal to toggle with at least a second signal of the at least one group of signals.

6. The method of claim 1 further comprising:
determining if a first signal in the at least one group fails to toggle; and
modifying the test bench or the jitter database to cause the first signal to toggle.

7. The method of claim 1 wherein said one or more design constraints define timing relationships between a plurality of clock signals used in the circuit design.

8. A system comprising:
a memory storing instructions; and
a processor coupled with the memory and configured to execute the instructions, the instructions when executed causing the processor to:
define one or more design constraints associated with the circuit design;
determine at least one group of converging signals associated with the circuit design;
apply a plurality of jitters to clock domain crossing (CDC) paths of the at least one group of converging signals;
store, in a jitter database, the plurality of jitters;
determine number of counts that two or more signals in the at least one group of signals toggle jointly;
determine number of jitters associated with each of the counts of the jointly toggling signals; and
determine a test bench coverage from the number of jitters and their associated counts of the jointly toggling signals.

9. The system of claim 8 wherein said instructions further cause the processor to:
compile the circuit design, a test bench associated with the design, and the jitter database; and
apply the test bench and the plurality of jitters to the compiled circuit design using a simulation tool.

10. The system of claim 8 wherein said instructions further cause the processor to:
modify the test bench or the jitter database if the coverage is determined to be less than a threshold value.

11. The system of claim 8 wherein said instructions further cause the processor to:
determine if a first signal in the at least one group of signals toggles singly; and
modify the test bench or the jitter database to cause the first signal to toggle with at least a second signal of the at least one group of signals.

12. The system of claim 8 wherein said instructions further cause the processor to:
determine if a first signal in the at least one group fails to toggle; and
modify the test bench or the jitter database to cause the first signal to toggle.

13. The system of claim 8 wherein said one or more design constraints define timing relationships between a plurality of clock signals used in the circuit design.

14. A non-transitory computer readable medium comprising stored instructions, which when executed by a processor, cause the processor to:
define one or more design constraints associated with the circuit design;
determine at least one group of converging signals associated with the circuit design;
apply a plurality of jitters to clock domain crossing (CDC) paths of the at least one group of converging signals;
store, in a jitter database, the plurality of jitters;
determine number of counts that two or more signals in the at least one group of signals toggle jointly;
determine number of jitters associated with each of the counts of the jointly toggling signals; and
determine a test bench coverage from the number of jitters and their associated counts of the jointly toggling signals.

15. The non-transitory computer readable medium of claim 14 wherein said instructions further cause the processor to:
compile the circuit design, a test bench associated with the design, and the jitter database; and
apply the test bench and the plurality of jitters to the compiled circuit design using a simulation tool.

16. The non-transitory computer readable medium of claim 14 wherein said instructions further cause the processor to:
modify the test bench if the coverage is determined to be less than a threshold value.

17. The non-transitory computer readable medium of claim 14 wherein said instructions further cause the processor to:
modify the jitter database if the coverage is determined to be less than a threshold value.

18. The non-transitory computer readable medium of claim 14 wherein said instructions further cause the processor to:
determine if a first signal in the at least one group of signals toggles singly; and
modify the test bench or the jitter database to cause the first signal to toggle with at least a second signal of the at least one group of signals.

19. The non-transitory computer readable medium of claim 14 wherein said instructions further cause the processor to:
determine if a first signal in the at least one group fails to toggle; and
modify the testbench or the jitter database to cause the first signal to toggle.

20. The non-transitory computer readable medium of claim 14 wherein said one or more design constraints define timing relationships between a plurality of clock signals used in the circuit design.

* * * * *